July 12, 1932.  J. P. BARR  1,867,488
CAMERA FILM AND SPOOL LOADING DEVICE
Filed March 3, 1930   2 Sheets-Sheet 1
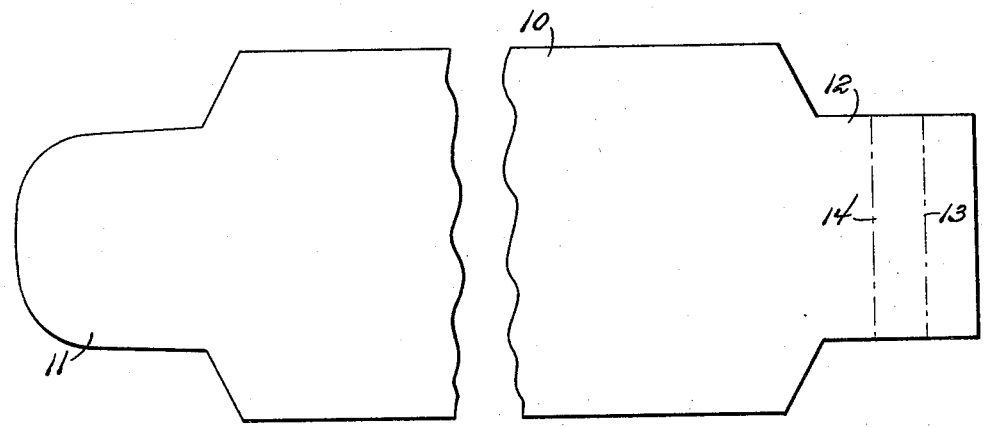
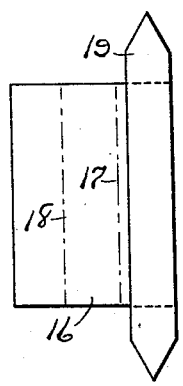 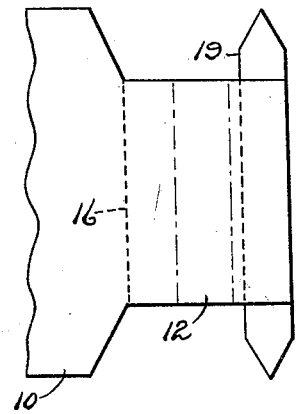 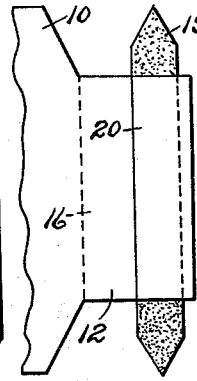 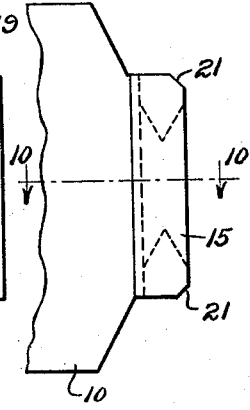
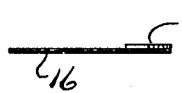 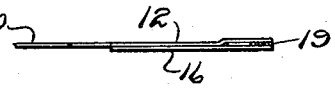
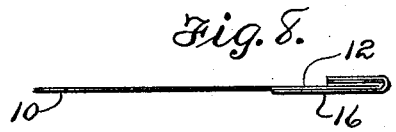 
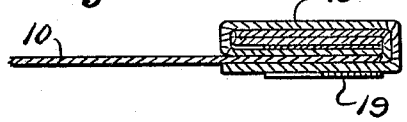
Jesse Paul Barr
INVENTOR
BY *Victor J. Evans*
ATTORNEY July 12, 1932. J. P. BARR 1,867,488
CAMERA FILM AND SPOOL LOADING DEVICE
Filed March 3, 1930 2 Sheets-Sheet 2

Jesse Paul Barr
INVENTOR
BY Victor J. Evans
ATTORNEY

Patented July 12, 1932

1,867,488

UNITED STATES PATENT OFFICE

JESSE PAUL BARR, OF HUMBOLT, TENNESSEE

CAMERA FILM AND SPOOL LOADING DEVICE

Application filed March 3, 1930. Serial No. 432,914.

This invention relates to improved means for loading films for cameras and it consists in the novel features hereinafter described and claimed.

An object of the present invention is to provide means for attaching the paper backing strip to a spool, so that when the strip is attached at the factory, its manner of engagement with the spool will insure true winding of the backing strip and film upon the spool.

Another object of the invention is the provision of means for attaching the strip to the spool when the camera is being loaded so as to insure true winding when the film is adjusted for an exposure, the manner of contact between the backing strip and receiving spool for the film acting to position the longitudinal edge of the strip at right angles to the axial center of the spool, while the character of engagement between the strip and spool will prevent relative accidental movement, so that the engagement will be properly maintained for a true winding of the strip.

Another object of the invention is the provision of a film loading device which includes a universal film spool capable of use at either end of the film strip and having complemental ends, so that either end of the winding spool may be engaged with the winding key of the camera, the key notches for this purpose however being arranged at right angles to reduce liability of weakening the spool.

With the above and other objects in view, the invention further includes the following novel features and details of construction, to be hereinafter more fully described, illustrated in the accompanying drawings and pointed out in the appended claim.

In the drawings:—

Figure 1 is a plan view of a film backing strip constructed in accordance with the invention and before attaching the wedge member.

Figure 2 is a plan view of the blank and adhesive strip from which the wedge member is made.

Figure 3 is a fragmentary plan view showing a portion of the backing strip with the blank of the wedge member arranged in position for the initial step in its formation.

Figure 4 is a like view showing the wedge member partly folded.

Figure 5 is a similar view with the wedge member completed.

Figure 11:
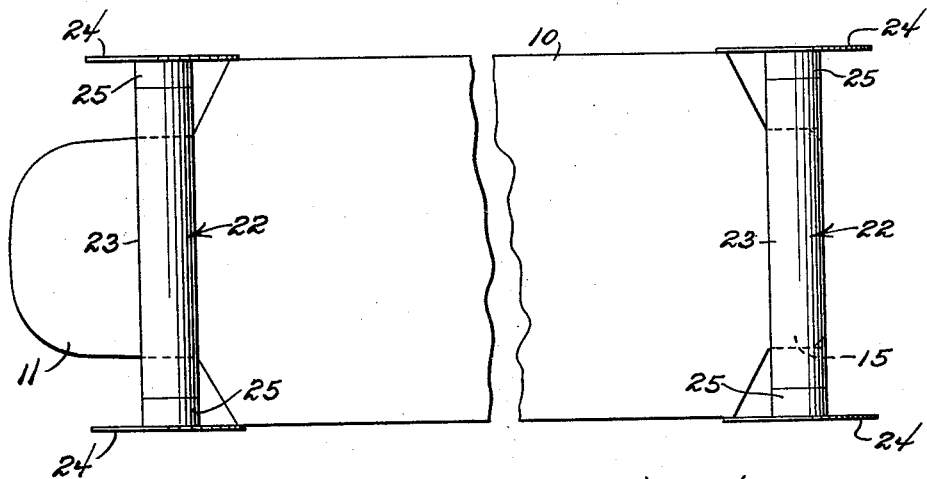
Figure 12:
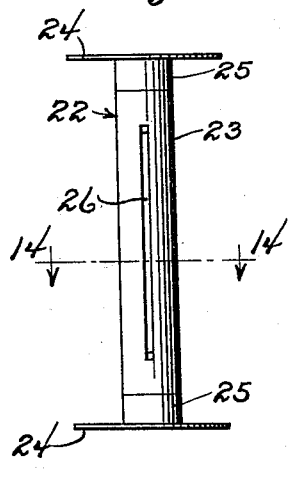
Figure 13:
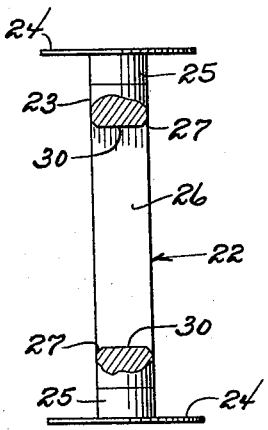
Figure 15:
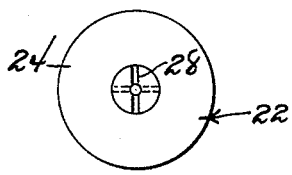
Figure 14:
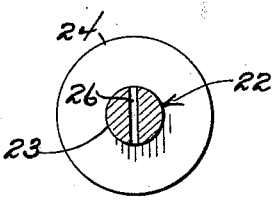
Figure 16:
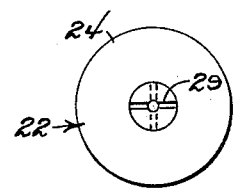

Figure 6 is an edge view of Figure 2.
Figure 7 is an edge view of Figure 3.
Figure 8 is an edge view of Figure 4.
Figure 9 is an edge view of Figure 5.
Figure 10 is an enlarged fragmentary sectional view on the line 10—10 of Figure 5.
Figure 11 is a fragmentary plan view illustrating the manner of engagement between the backing strip and spools.
Figure 12 is an elevation of one of the spools per se.
Figure 13 is an elevation at right angles to Figure 12 with parts broken away and shown in section.
Figure 14 is a section on the line 14—14 of Figure 12.
Figure 15 is a view looking at one end of the spool.
Figure 16 is a view looking at the opposite end.

Referring to the drawings in detail wherein like characters of reference denote corresponding parts, the reference character 10 indicates a backing strip for a film. This strip is made of the ordinary backing paper employed for this purpose and is provided at one end with a tongue 11. At its opposite end the strip is provided with a tongue 12 which is scored as indicated at 13 and 14 to provide fold lines. The width of the tongues 11 and 12 are exactly the same.

The tongue 12 provides means for engagement with a wedge member 15 which is shown in Figure 5 of the drawings. This member is made from a blank 16 of paper which is scored as shown at 17 and 18 to provide fold lines. The reference character 19 indicates a holding strip having one face provided with an adhesive as shown in Figure 4 of the drawings. The strip 19 extends beyond the side edges of the blank 16 and in forming the wedge 15, this strip is attached as shown in Figure 2. The blank 16 is then placed beneath the tongue 12 as shown in Figure 3 and the outer extremities of the blank and tongue are folded over as shown at 20 in Figure 4.

This fold is along the fold lines 13 and 17 and the blank and tongue are subsequently folded along the lines 14 and 18 with the outer extended ends of the holding strip 19 folded beneath and pasted to the under face of the completed wedge as shown in Figures 5 and 9 of the drawings. A compressible member or wedge is thus provided whose length is co-extensive with the width of the tongues 11 and 12. The outer corners of the wedge are round or chamfered as shown at 21.

The invention further includes a spool 22, the body portion 23 of which is provided at each end with flanges 24. These flanges are formed of thin metal and are provided with collars 25 which represent the opposite reduced ends of the body 23. This provides means of attachment for the flanges 24 and acts to resist tendency of the spool to slip.

The body 23 is provided with a longitudinally disposed slot 26 which extends through the body and whose length is co-extensive with the width of the tongues 11 and 12. The corners of the end walls of the slot 26 are rounded or chamfered as shown at 27. One end of the spool is provided with a diametrically extending notch 28 while the opposite end is provided with a similar notch 29, the notch however at one end of the spool being disposed at right angles to the notch at the opposite end as indicated by dotted lines in Figures 15 and 16.

In loading the film upon the spool at the factory, the tongue 11 is inserted through the slot 26, the opposite edges of the tongue being in a plane parallel with the opposite edges of the strip 10 and as the end walls 30 of the slot 26 are at right angles to the axis of the spool, when the strip is wound upon the spool it will run true.

To further insure proper positioning of the strip and spool, the diameter of the flanged ends 24 of the spool is such that the inner faces of the flanges will engage the side edges of the strip 10 as clearly shown in Figure 11 of the drawings. The film may thus be loaded upon the spool with the strip wound absolutely true without the exercise of undue care on the part of the operator. Much time and labor will thus be saved and the cost of loading the films will be materially reduced.

The purchaser of the roll when loading the camera inserts the wedge 15 in the slot 26 of the empty spool, the wedge having a snug fit within the slot so that the edges of the strip will be at true right angles with respect to the axial center of the spool. This is due to the manner of contact between the ends of the wedge 15 and the end walls 30 of the slot 26, and contact of the spool flanges 24 with the edges of the strip. The manner of forming the wedge 15 renders the same springy or compressible so that the wedge may be forced into the slot 26 and will have a binding, frictional, although yielding engagement in the walls of the slot. By rounding or chamfering the corners 21 of the wedge and the corners 27 at the ends of the slot 26, insertion of the wedge within the slot will be greatly facilitated.

By arranging the slots 28 and 29 in opposite ends of the spool, the purchaser will be prevented from mistake in connecting the spool and strip 10, as either end of the spool may be engaged by the winding key.

The invention is susceptible of various changes in its form, proportions and minor details of construction and the right is herein reserved to make such changes as properly fall within the scope of the appended claim.

Having described the invention what is claimed is:—

A film loading device comprising a spool having a longitudinal slot therein, a backing strip provided at its end with a tongue of the same transverse breadth as the length of the slot whereby the side edges of the tongue contact with the end walls of the slot when inserted therein, a wedge strip folded in the end of the tongue and a holding strip adhered to the backing strip and the wedge strip at said fold.

In testimony whereof I affix my signature.
JESSE PAUL BARR.